(12) United States Patent
Cierniak (10) Patent No.: US 7,103,723 B2
(45) Date of Patent: Sep. 5, 2006

(54) PRIORITY-BASED CODE CACHE MANAGEMENT

(75) Inventor: Michal Cierniak, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 341 days.

(21) Appl. No.: 10/374,909

(22) Filed: Feb. 25, 2003

(65) Prior Publication Data

US 2004/0168028 A1    Aug. 26, 2004

(51) Int. Cl.
*G06F 13/18* (2006.01)
*G06F 12/08* (2006.01)
(52) U.S. Cl. .................. 711/134; 711/133; 711/135; 711/136; 707/206
(58) Field of Classification Search ............... None
See application file for complete search history.

(56) References Cited

U.S. PATENT DOCUMENTS

| 6,070,173 | A * | 5/2000 | Huber et al. ............. 707/206 |
| 6,112,280 | A * | 8/2000 | Shah et al. .............. 711/129 |
| 6,442,751 | B1 * | 8/2002 | Cocchi et al. ............ 717/133 |
| 6,625,808 | B1 * | 9/2003 | Tarditi .................. 717/154 |

2003/0009749 A1 * 1/2003 Subrahmanyam et al. .. 717/154

FOREIGN PATENT DOCUMENTS

| EP | 1 283 465 A2 | 2/2003 |
| WO | WO 02/15003 A2 | 2/2002 |

OTHER PUBLICATIONS

Kim Hazelwood, Michael D. Smith; "Code Cache Management Schemes for Dynamic Optimizers," Proceedings of the Sixth Annual Workshop on Interaction between Compilers and Computer Architectures (Interact '02), 2002 IEEE, pp. 1-9, USA.
PCT/US2004/002791 Int'l Search Report & Written Opinion dated Feb. 15, 2006.

* cited by examiner

*Primary Examiner*—B. James Peikari
(74) *Attorney, Agent, or Firm*—Guojun Zhou (57) ABSTRACT

An arrangement is provided for improving the performance of a computing system, specifically for improving the efficiency of code cache management for a system running platform-independent programs with a small memory footprint. The code cache of such a system is continuously monitored during runtime. When a condition warrants performing code cache management, the priority-based code cache management is performed based on selective code garbage collection. The code garbage collection is conducted selectively for dead methods in the code cache based on probabilities of the dead methods being reused.

27 Claims, 7 Drawing Sheets

PRIORITY-BASED CODE CACHE MANAGEMENT

BACKGROUND

1. Field

The present invention relates generally to cache and memory management and, more specifically, to code cache management for devices with a small memory footprint.

2. Description

Platform-independent programming languages such as Java and C# have gained significant market presence, especially for network-based applications. Typically, programs written in these languages are first compiled to codes in a platform-neutral distribution format called bytecodes. The bytecodes cannot directly run on any platform. They must be interpreted into instructions understandable by a specific platform. For Java programs, it is a Java Virtual Machine (JVM) that interprets bytecodes into instructions understood by the platform (for C# programs, Common Language Infrastructure (CLI) is the virtual machine). However, the interpretation by JVM usually imposes an unacceptable performance penalty for the execution of a bytecode because of the large runtime overhead processing required. A Just-In-Time (JIT) compiler has been designed to improve the JVM's performance. It compiles the bytecode of a given method into a native code of a platform before the method is first called. The native code of the method is stored in memory and any later calls to the method will be handled by this faster native code, instead of by the slower JVM's interpretation.

For devices with a small memory footprint, particularly mobile devices, a native code generated by a JIT compiler may be too big to fit in the memory. As a result, many manufacturers of such devices choose not to use JIT compilers and thus lose the performance advantage brought about by the JIT compilers. To use a JIT compiler for small memory devices, it is necessary to employ memory management mechanisms, which efficiently reuse memory space occupied by other native codes. When such memory management mechanisms are applied to a code cache where a native code is stored, they are usually referred to as Code Cache Management (CCM) mechanisms.

The issues of CCM are typically discussed as part of dynamic optimization problems, as discussed in "Code Cache Management Schemes for Dynamic Optimizers" by K. Hazelwood and M. D. Smith in the Proceedings of the Sixth Annual Workshop on Interaction between Compilers and Computer Architectures (INTERACT'02). One CCM scheme is Full Cache Flush (FCF). Under this scheme, upcoming codes begin filling a cache from the lowest address toward higher addresses. Once the cache is full, all the codes in the cache are flushed and the filling process is started again. Another CCM scheme is the Least-Recently Accessed Flush (LRAF), which flushes codes that have not been accessed recently when the cache is full. When the space freed by the least-recently accessed code is not enough to hold the upcoming code, the adjacent code(s) are flushed so that enough contiguous space can be made for the new code. Another CCM scheme is called Least-Frequently Accessed Flush (LFAF). The idea of LFAF is essentially the same as that of LRAF except that the least-frequently accessed code is the first candidate to be flushed. Yet another CCM scheme is Least-Recently Created Flush (LRCF) under which codes in a code cache are replaced in the same order as they are inserted. Yet another CCM scheme is Largest Element Flush (LEF), which first flushes the largest code (and the adjacent code(s) if more contiguous space is needed by the new code) to minimize the flush number. Yet another CCM scheme is the Best-Fit Element Flush (BFEF), which first flushes the code whose size is just enough (if not exactly same, then the smallest code whose size is larger than the new code size) for the new code.

When CCM schemes are applied to small memory systems running platform-independent programs (e.g., Java-like programs) with JIT compilers, recompilation rate of codes may increase. This is because a later code may call a previously compiled code that has already been flushed as a result of CCM. One goal of a CCM scheme for a small memory system running Java-like programs with a JIT compiler is to improve the efficiency of memory usage without significantly increasing the recompilation rate. Another goal is to reduce the overhead incurred by a CCM scheme because a large overhead can slow down the processing speed and thus compromises the possible performance improvement brought by the CCM scheme. The current available CCM schemes as mentioned above, however, can result in a higher recompilation rate and/or a large overhead, especially for small memory systems running Java-like programs. Therefore, a more efficient CCM scheme that can reduce the recompilation rate without adding much overhead is necessary to improve the performance of small memory systems running Java-like programs.

BRIEF DESCRIPTION OF THE DRAWINGS

The features and advantages of the present invention will become apparent from the following detailed description of the present invention in which.

DETAILED DESCRIPTION

An embodiment of the present invention is a method and apparatus for efficiently managing a code cache in a computing system, particularly for a small memory computing system running platform-independent programs with a JIT compiler. The present invention may be used to enhance the performance of such a computing system by ensuring that enough space exists in a code cache for a new code without significantly increasing the recompilation rate or incurring much overhead. Priority-based CCM based on selective code garbage collection (CGC) mechanism may be used to selectively recycle the space in the code cache occupied by dead methods. A method that survives CGC is called a surviving method. When the selective CGC is performed, not all dead methods are considered as garbage. Those dead methods with a high probability of being reused by a program at a later time are kept in the code cache and not collected by the CGC mechanism. The probability of a method being reused by the program in the future may be measured by a value of a surviving method counter (SMC) of the method. Whenever a condition of a code cache warrants the selective CGC, all dead methods are sorted into a queue according to the values of their SMC's, with the method whose SMC value corresponds to the lowest probability of being reused being at the bottom of the queue. The CGC starts with the dead methods at the bottom of the queue until the requirement of the free space in the code cache is satisfied.

The priority-based CCM mechanism based on the selective CGC approach can improve the efficiency of the code cache usage. This mechanism can not only reduce the recompilation rate of methods, but incur little overhead at runtime as well. Particularly, this mechanism allows small memory systems running Java-like languages to use a JIT compiler to improve the performance.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
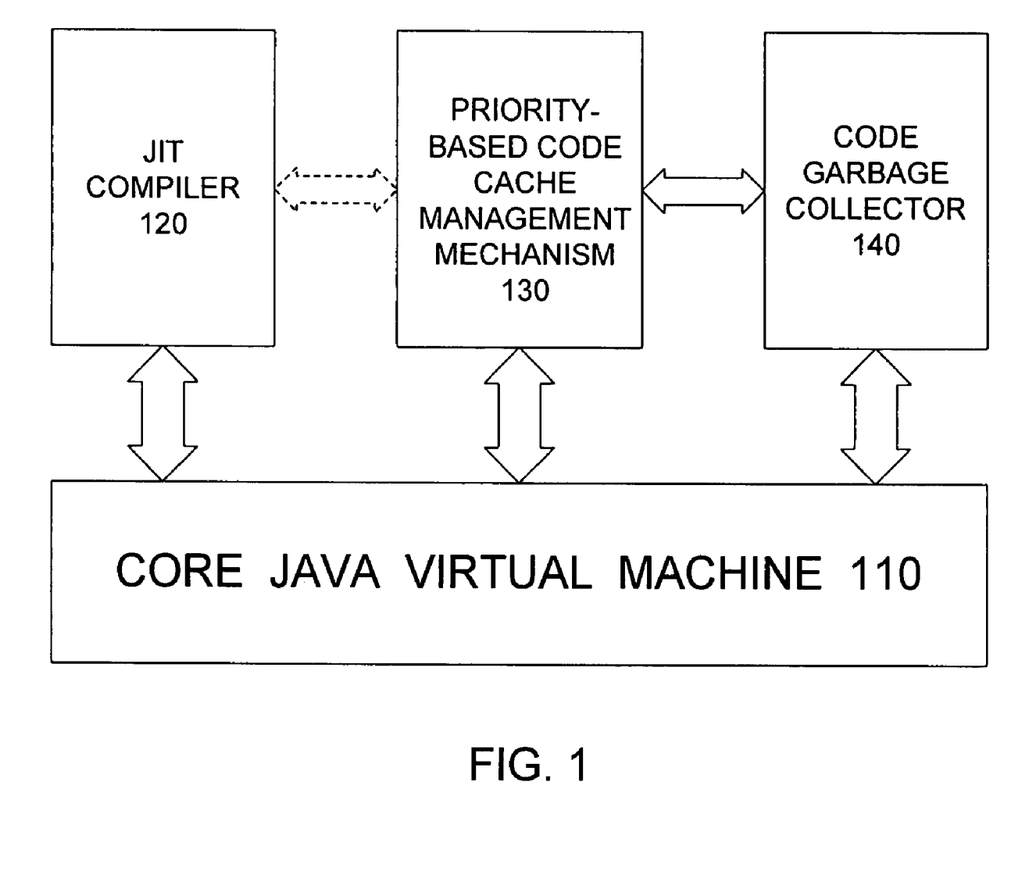
FIG. 1 depicts a high-level framework of an example system using priority-based code cache management mechanism for Java programs, according to an embodiment of the present invention.

FIG. 1 depicts a high-level framework of an example system using priority-based code cache management mechanism for Java programs, according to an embodiment of the present invention. The core JVM 110 accepts a platform-independent Java bytecode and then either interprets the bytecode into instructions understandable by the underlying processor or compiles the bytecode into a native code stored in a code cache by using a JIT compiler 120. The core JVM has an execution mechanism to execute the native code or the interpreted bytecode. Normally executing a Java code through a JIT-compiled native code stored in a code cache is much faster than executing the same Java code through JVM-interpreted instructions. This is why most JVMs use a JIT compiler. However, a native code occupies memory space in a code cache. In many systems that have a large code cache, storing native codes in a code cache is not a problem. For systems with a small code cache, however, the space in the code cache is precious. The efficient use of such a small code cache is desirable.

The code garbage collector 140 may be used to recycle the space occupied by dead methods in a code cache. If the code garbage collector recycles the space of methods as soon as these methods are found dead, however, the recompilation rate of some methods may be high because some dead methods may be needed at a later time. One reason that a JIT-compiled native code can improve the execution speed of a Java program is that the native code of a method can be reused once compiled. If the use of a CGC technique results in a high recompilation rate, one advantage of using a JIT compiler may be lost. Therefore, using a code garbage collector to promptly reclaim the space occupied by dead methods in a code cache may not be enough to improve the efficiency of code cache usage. One goal of the present invention is not only to reclaim the space occupied by dead methods in a code cache, but also to reduce the general recompilation rate.

The priority-based CCM mechanism 130 may be used to improve the efficiency of the use of a code cache and to reduce the general recompilation rate of methods. The priority-based CCM mechanism determines which dead methods have a higher priority of being collected as garbage than others based on the probability of each dead method being reused in the future. A dead method with a higher reuse probability has a higher probability of surviving the CGC. The reuse probability of a method may be measured by a value of SMC of the method. It may be a design choice with how the value of the method SMC relates to the method reuse probability. In one embodiment, a high value of the method SMC may correspond to a high method reuse probability. In another embodiment, a low value of the method SMC may correspond to a high method reuse probability. The value of a method SMC may be updated during each priority-based CCM session. The value of the method SMC may also be updated whenever the method is recompiled. In one embodiment, based on values of SMCs of dead methods, the dead methods may be sorted into a queue so that a dead method with the lowest reuse probability stays at the bottom of the queue. The code garbage collector 140 may start recycling dead methods from the bottom and upwards until the code cache space requirement has been satisfied.

Figure 2:
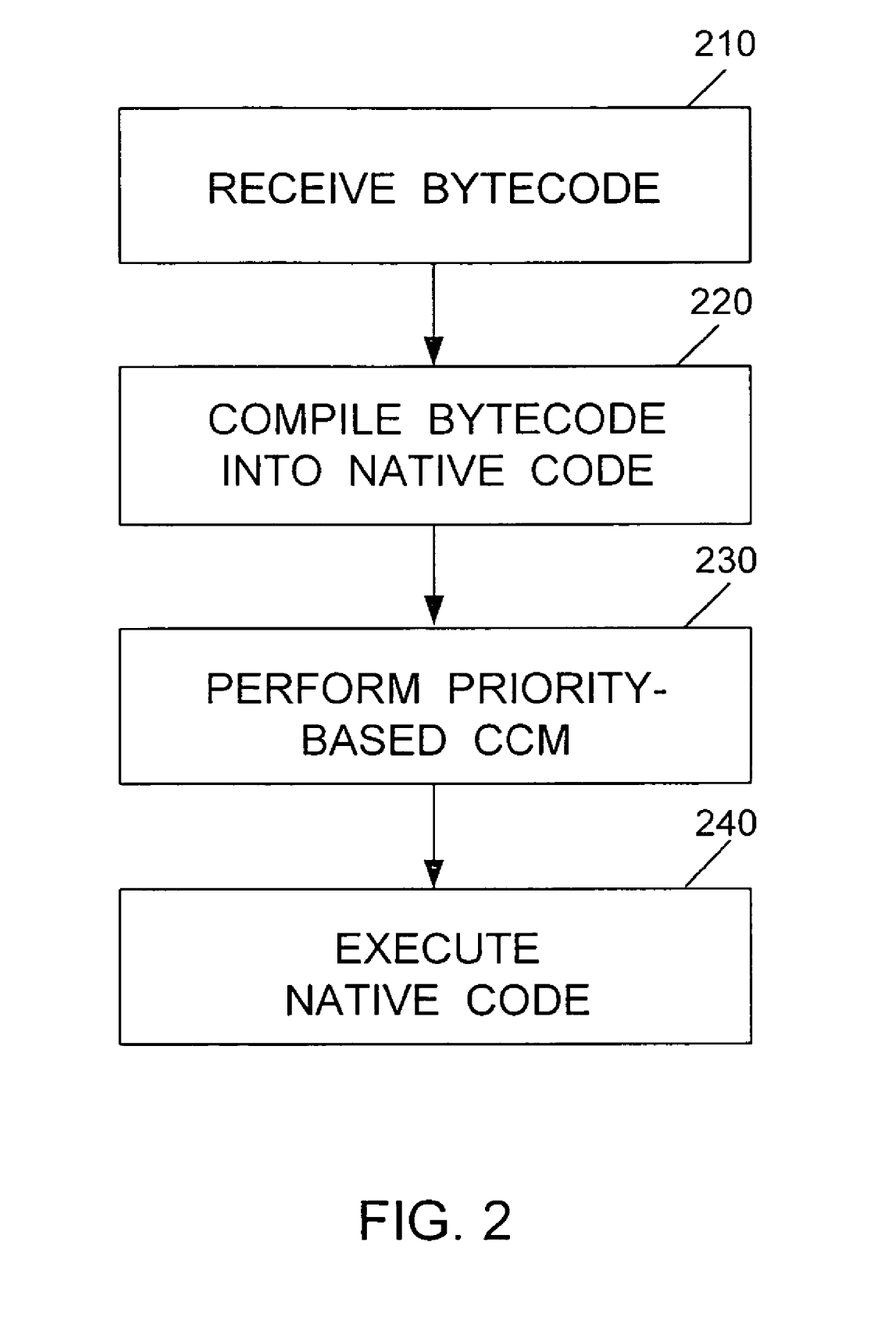
FIG. 2 is an exemplary flow diagram of a process in which priority-based code cache management is performed in a system running platform-independent programs, according to an embodiment of the present invention.

FIG. 2 is an exemplary flow diagram of a process in which priority-based code cache management is performed in a system running platform-independent programs, according to an embodiment of the present invention. At block 210, a platform-independent bytecode (usually in class files for a Java program) may be received by the JVM and passed to the JIT compiler. At block 220, the JIT compiler compiles the bytecode into a native code. The native code may be initially stored in a buffer and wait to be transferred to a code cache. At block 230, the priority-based CCM may be performed by the priority-based CCM mechanism so that the code cache can be efficiently managed based on a priority of each method to make more efficient use of the space in the code cache. Also at block 230, the native code generated by the JIT compiler may also be transferred from the buffer to the code cache by the priority-based CCM mechanism. The order of blocks 220 and 230 may be exchanged according to another embodiment of the present invention. For example, if the received bytecode is very big and its corresponding native code may be too big to fit in the buffer, the native code may have to be directly put into the code cache. In this situation, the priority-based CCM may be performed prior to compiling the bytecode into a native code so that there is enough space in the code cache for the compiled native code.

Figure 3:
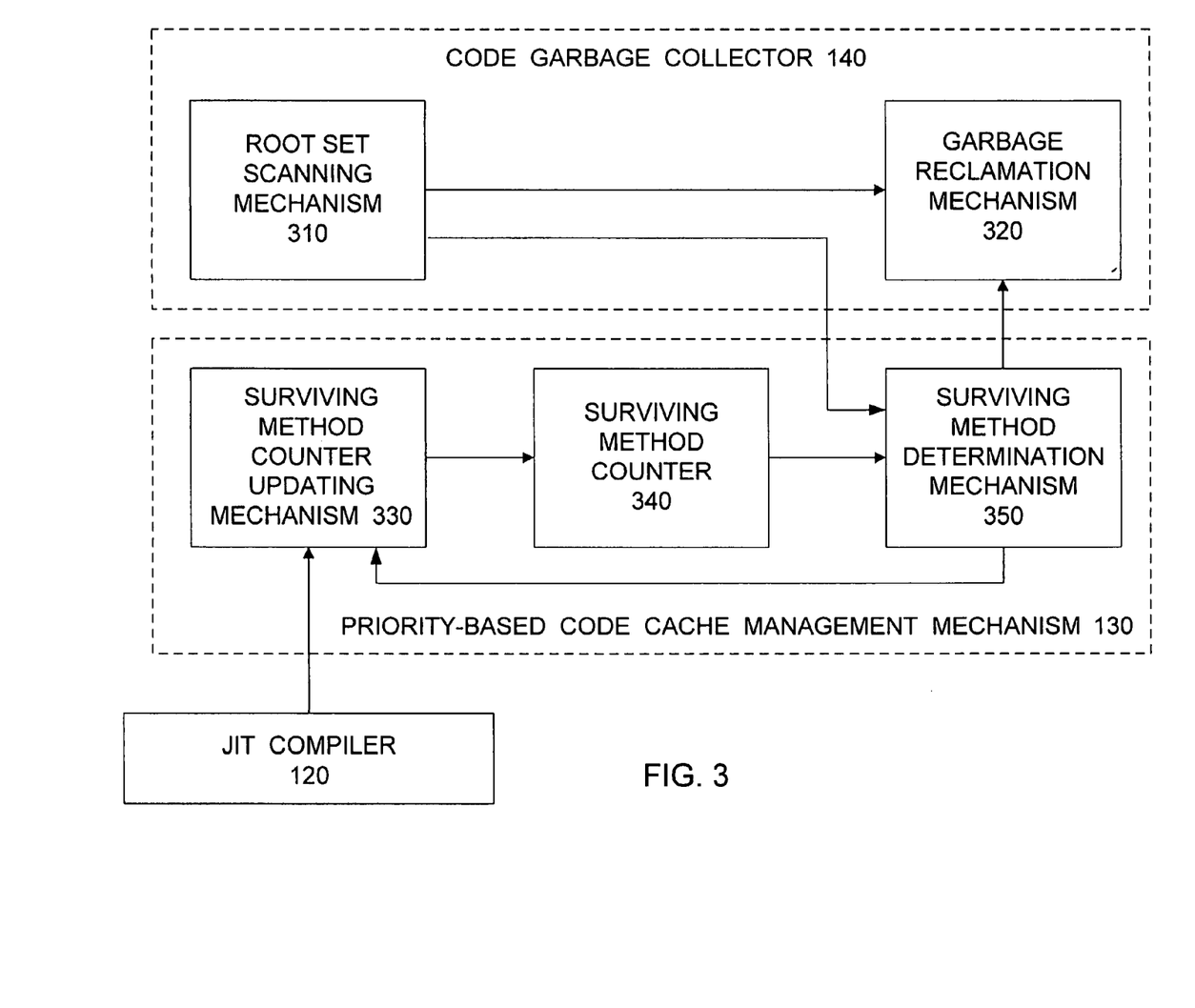
FIG. 3 is a high-level functional block diagram of a priority-based code cache management mechanism and a code garbage collector, according to an embodiment of the present invention.

FIG. 3 is a high-level functional block diagram of a priority-based code cache management mechanism and a code garbage collector, according to an embodiment of the present invention. The code garbage collector 140 comprises at least two components: root set scanning mechanism 310 and garbage reclamation mechanism 320. These two components may be functionally or temporally interleaved, and a reclamation technique may be dependent on a garbage detection technique that is performed by the root set scanning mechanism.

The root set scanning mechanism distinguishes live methods from dead methods. At the moment the code garbage collector is invoked, the active methods are considered live. The activeness of a method may be determined based on stack information. Only live methods have information (e.g., return pointer, variables, and etc.) stored in stack. These active methods form a basic root set. There are two ways to determine the final set of live methods. These two ways result in two different final sets of live methods: a broad set and a narrow set. The broad set of live methods includes all methods reachable from the methods in the root set, that is, all methods on any directed path of pointers from the root set. The narrow set of live methods includes the methods only in the basic root set. Any method outside the final set of live methods is considered dead and can be recycled. By definition, the broad set may contain more methods than the narrow set.

One potential problem with a broad set is that there may be many methods reachable from the root set and the number of resulting live methods may be too large. As a result, CGC may not be able to release as much space in a code cache as needed. This problem may occur more often for small memory systems than large memory systems. The worst case is that CGC may be useless because the code cache is full of live methods defined by the broad set and no space can be reclaimed. For small memory systems, it may be more desirable to use a narrow set of live methods. One disadvantage of the narrow set is that the recompilation rate may be high initially because methods pointed to by the methods in the root set are considered dead and may be recycled during CGC. The priority-based CCM will eventually overcome this disadvantage. If a method is inappropriately recycled initially, the value of SMC of this method will change (increase or decrease), resulting in an increased reuse probability of this method. In other words, the method will have a smaller probability of being recycled at a later time. Therefore, the narrow set definition of live methods may work better for small memory systems than the broad set definition of live methods.

Figure 6:
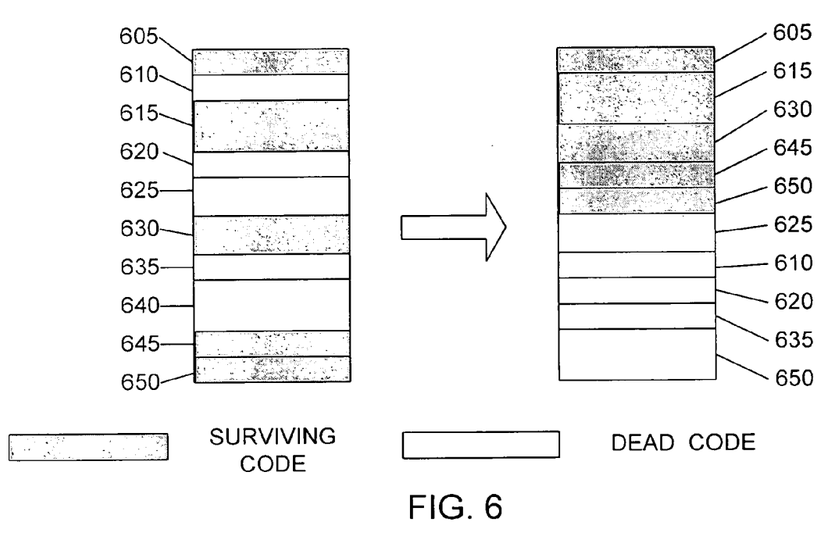
FIG. 6 is a schematic illustration of surviving code compaction as one way of conducting priority-based code cache management, according to an embodiment of the present invention.

The garbage reclamation mechanism 320 reclaims the space occupied by dead methods based on the final set of live methods provided by the root set scanning mechanism. Typically dead methods are not located together and occupy a contiguous area in a code cache. They may be scattered in different areas of the code cache. The reclamation may result in fragmentation in the code cache, which may render the reclaimed space not very usable. There are a variety of reclamation techniques that generally fall into two categories: moving and non-moving reclamation. A moving reclamation technique not only reclaims the space occupied by dead methods but also moves live methods to a contiguous area in a code cache as illustrated in FIG. 6. Surviving methods 615, 630, 645, and 650 are moved to an area contiguous to method 605 at one end of the code cache so that free space after moving is also contiguous. A non-moving reclamation technique, on the contrary, simply reclaims the space occupied by a dead method but does not move live methods to a contiguous area in the code cache. The non-moving reclamation technique is more likely to create fragments in a code cache. With fragments in a code cache, the usable space in the code cache may actually be smaller than the total free space because small fragments may not fit for a new code. For example, reclaimed space 610 in FIG. 6 might not be able to be reused by a new code whose size is larger than the size of space 610, if the live methods are not moved.

Figure 7:
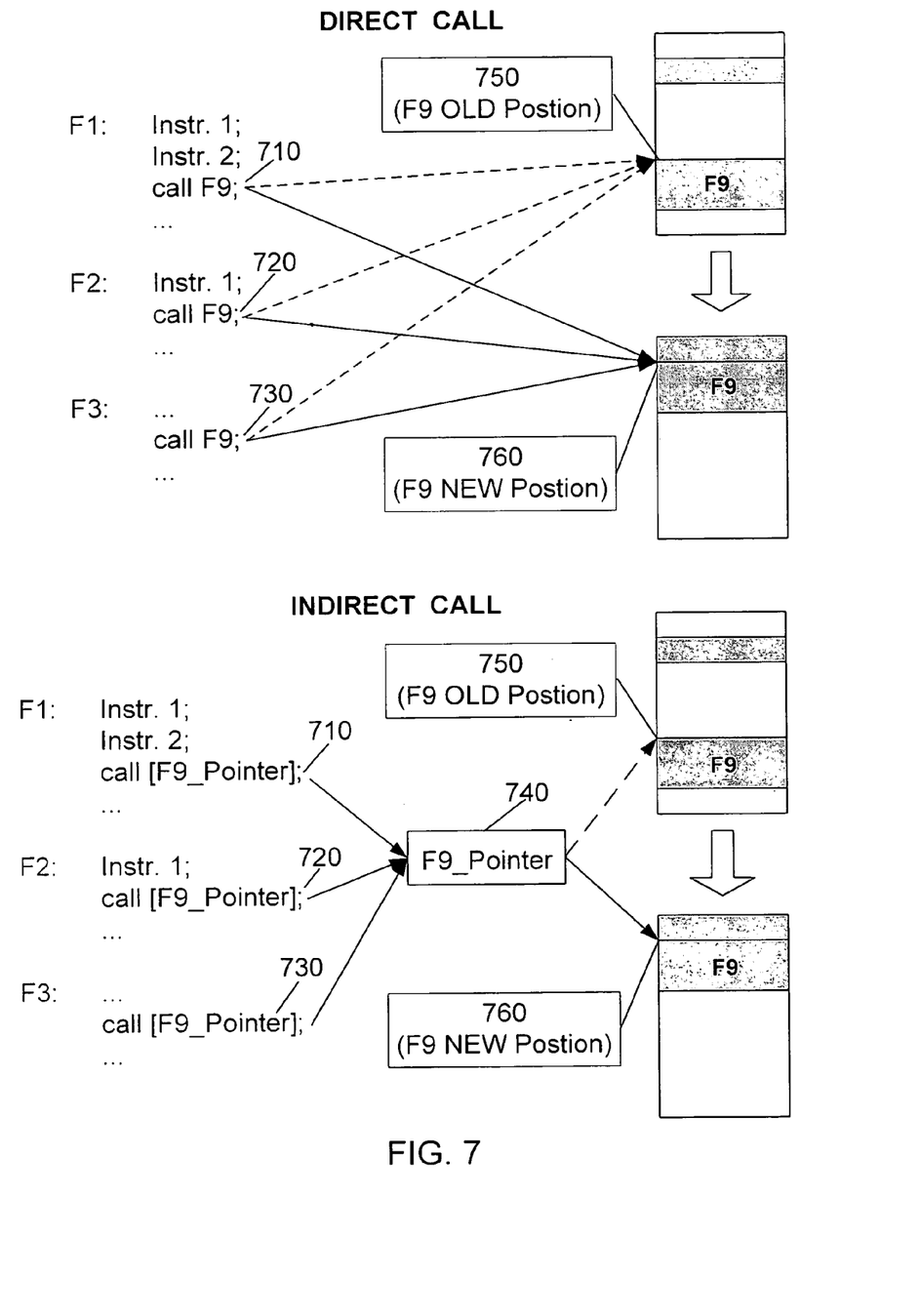
FIG. 7 is a schematic illustration of different impacts of direct versus indirect calls on surviving code compaction as one way of conducting priority-based code cache management, according to an embodiment of the present invention.

Moving a live method to a new area in a code cache, however, may cause problems if the method is position dependent. One way to solve such problems is to require that the JIT compiler generate position independent code (PIC). Indirect calls may be used to generate PICs. FIG. 7 is a schematic illustration of different impacts of direct versus indirect calls on moving garbage reclamation techniques. With direct calls, each instruction (e.g., instructions 710, 720, and 730) that calls a moved live method (e.g., F9) must know the new position (e.g., 760) of the method. With indirect calls, however, each instruction (e.g., instructions 710, 720, and 730) that calls a moved method (e.g., F9) does not need to know the new position (e.g., 760) of the method. Instead, a calling instruction such as 710 only needs to know the pointer of the called method such as F9. It is the pointer to the method (e.g., 740) that must know the new position (e.g., 760) of the method if the method is moved. Using indirect calls is one way to generate PICs; there may be other ways to generate PICs. Even if generating PICs is somehow not possible, relocation tables may be used to patch the method to reflect the new location of the method.

Using a moving garbage reclamation technique may make a code cache more usable after CGC than a non-moving garbage reclamation technique. The moving garbage reclamation technique may incur a larger runtime overhead as well. The present invention works with either moving or nonmoving garbage reclamation techniques.

As shown in FIG. 3, the priority-based CCM mechanism 130 may comprise three components: SMC updating mechanism 330, SMC 340, and surviving method determination mechanism 350. The SMC 340 keeps track of the probability of a method being reused during runtime. The SMC updating mechanism 330 updates the value of an SMC. The surviving method determination mechanism 350 determines which dead methods may be reclaimed based on the information provided by the root set scanning mechanism, SMC values of dead methods provided by SMC 340, and other factors. Other factors may include meeting a triggering condition to trigger CGC and meeting a stopping condition to stop CGC. The triggering and stopping conditions may be a threshold that may be based on the free space size of the code cache or the number of surviving methods in the code cache. For example, CGC may be triggered whenever the free space size of the code cache falls below a low threshold (i.e., meets the triggering condition), and may be stopped whenever the free space size of the code cache exceeds an upper threshold (i.e., meets the stopping condition). Similarly CGC may be triggered whenever the number of surviving methods in the code cache exceeds an upper threshold (i.e., meets the triggering condition), and may be stopped whenever the number of surviving methods in the code cache falls below a lower threshold (i.e., meets the stopping condition). After CGC, the set of surviving methods include both live methods and those dead methods that are not reclaimed.

The SMC updating mechanism 330 updates the value of a method SMC based on the information provided by a JIT compiler 120 and the surviving method determination mechanism 350. The information provided by a JIT compiler 120 comprises whether a method is first compiled and whether a method previously recycled is recompiled. In one embodiment, when a method is recompiled, the value of the method SMC may increase by a number. The information provided by the surviving method determination mechanism 350 comprises whether a method is live during priority-based CCM. In one embodiment, when the method is live during the priority-based CCM, the value of the method SMC may increase by a number; otherwise, the value of the method SMC of the method may decrease by a number. The SMC values help determine relative reuse probabilities among dead methods. Thus, the increment and decrement operations may be reversed to achieve the same results, e.g., the value of the method SMC may decrease by a number when the method is recompiled. The actual amount of value change for different events may be the same or different. In one embodiment, the value of a method SMC may increase by 2 whenever the method is recompiled, and may decrease by 1 whenever the method is live during the priority-based CCM. The increment and decrement amount may be limited so that the value of any SMC will fall within a pre-determined range.

Figure 4:
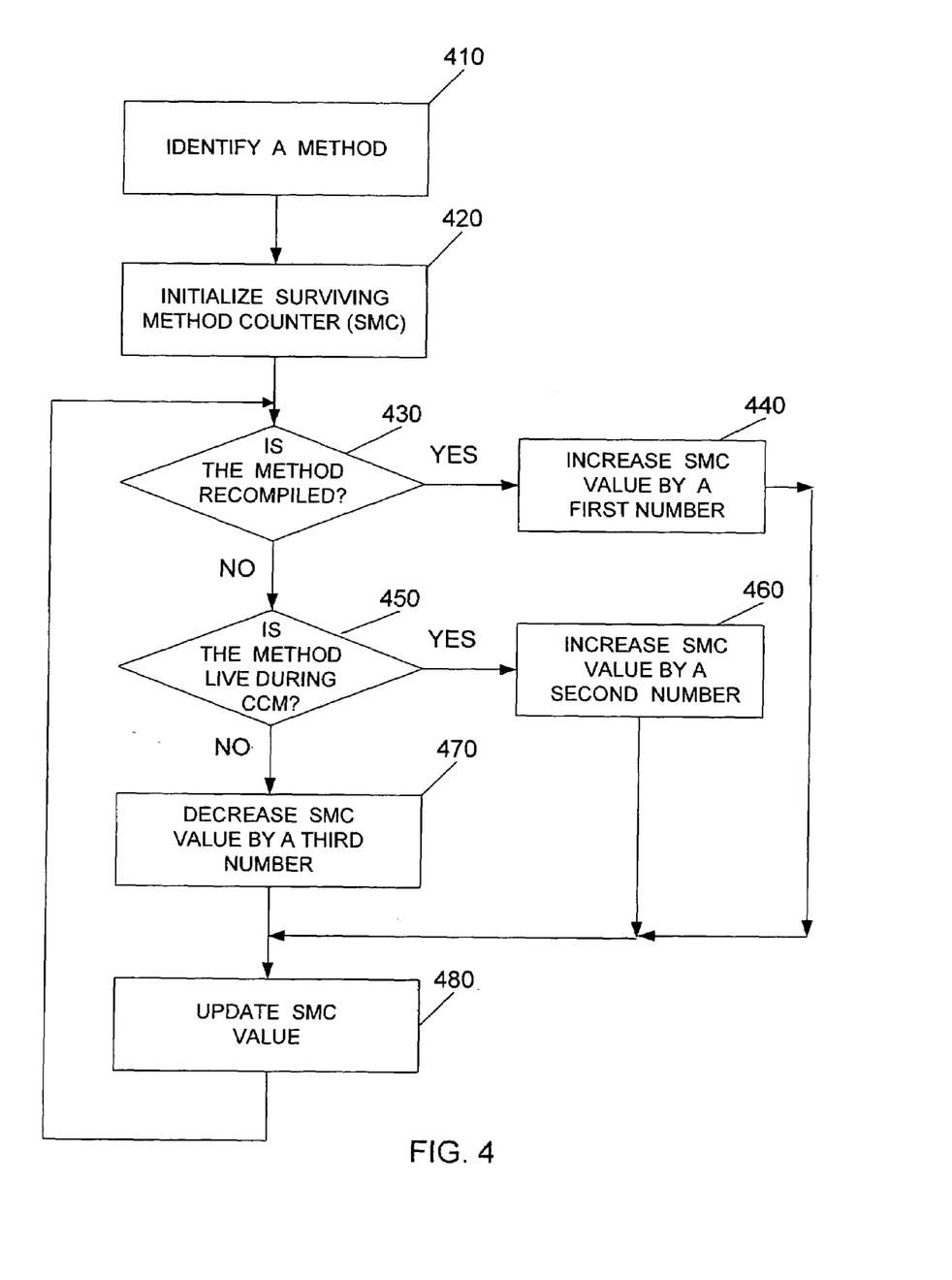
FIG. 4 is an exemplary flow diagram of a process in which a surviving method counter is updated according to an embodiment of the present invention.

FIG. 4 is an exemplary flow diagram of a process in which the value of a SMC is updated according to an embodiment of the present invention. At block 410, a method is identified by an initialization component of the SMC updating mechanism. The SMC is set up for the identified method with an initial value (e.g., zero) at block 420 by the initialization component. At block 430, a decision of whether the method previously recycled is recompiled is made. If the method is recompiled, the value of the method SMC increases by a first number at block 440; otherwise, a further decision of whether the method is live during CGC is made at block 450. If the method is live during the priority-based CCM, the value of the method SMC increases by a second number; otherwise, the value of the method SMC decreases by a third number. The first, second and third numbers may be the same or different. In one embodiment, the first number may be 5, the second number may be 1, and the third number may be 1. Additionally, the order of blocks 430 and 450 may be reversed, or the two blocks may proceed simultaneously. At block 480, the value of the method SMC may be updated and may be further compared with pre-determined boundaries to ensure the value falls within a pre-determined range. The updating of SMC value may be a continuing process. Thus, after block 480, a continuing check is needed to monitor if either of conditions set in block 430 and 450 is satisfied. Processing at all blocks is performed by the SMC updating mechanism.

Figure 5:
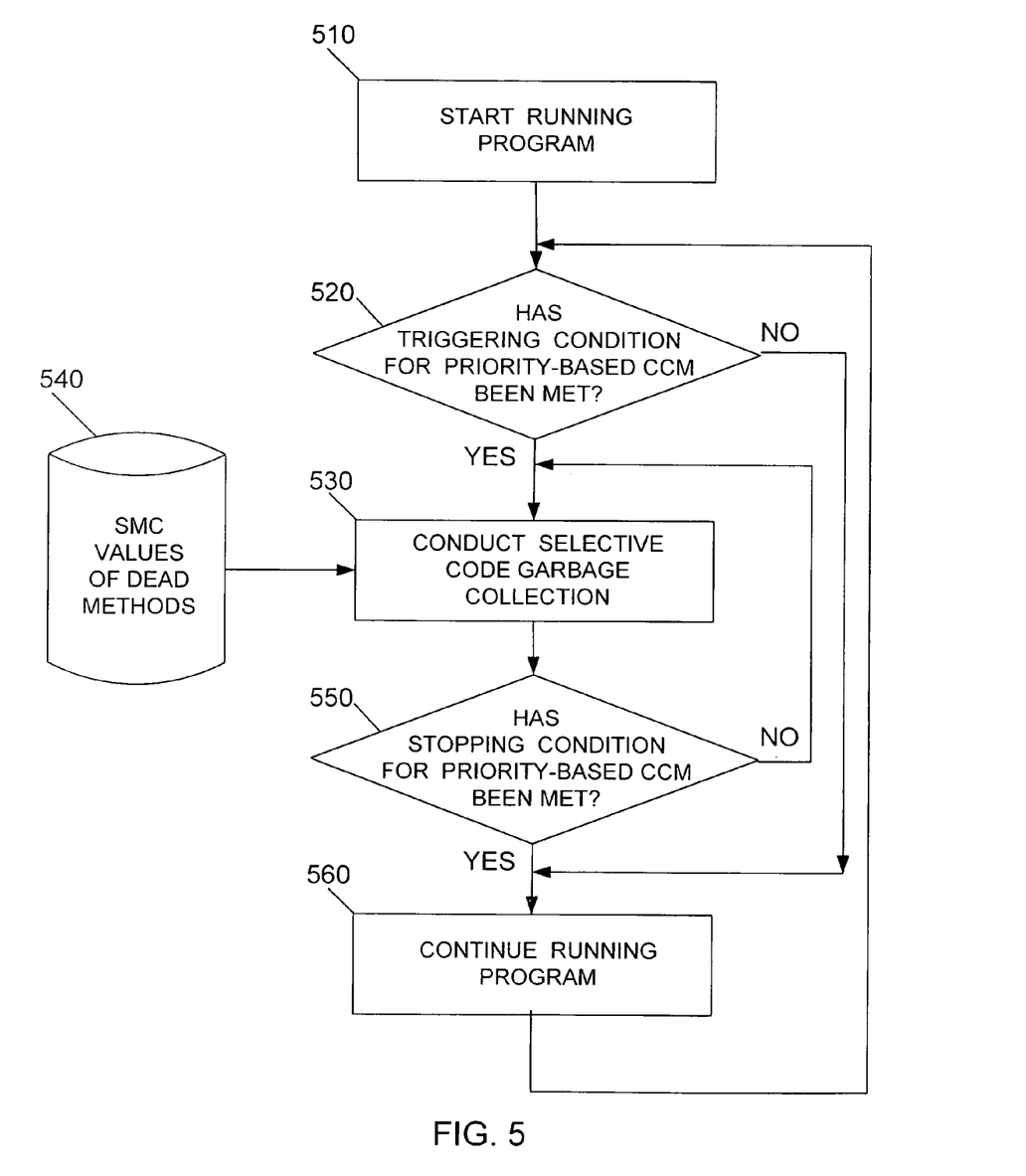
FIG. 5 is an exemplary flow diagram of a process in which priority-based code cache management is conducted through selective garbage collection based on values of surviving method counters, according to an embodiment of the present invention.

FIG. 5 is an exemplary flow diagram of a process in which priority-based CCM is conducted through selective garbage collection based on values of surviving method counters, according to an embodiment of the present invention. At block 510, JVM starts to run a program. At block 520, a decision of whether the triggering condition for priority-based CCM has been met is made by the surviving method determination mechanism 350. If the triggering condition has been met, the surviving method determination mechanism directs the garbage reclamation mechanism 320 to conduct selective CGC at block 530. At block 550, a decision of whether the stopping condition for priority-based CCM has been met is made by the surviving method determination mechanism. If the stopping condition has been met, the selective CGC is stopped and the JVM continues running the program at block 560; otherwise, more selective CGC is conducted at block 530. In one embodiment, blocks 530 and 550 may be combined. The surviving method determination mechanism needs to continuously monitor if the triggering condition for priority CCM is met.

Although an example embodiment of the present invention is described with reference to block and flow diagrams in FIGS. 1–7, persons of ordinary skills in the art will readily appreciate that many other methods of implementing the present invention may alternatively be used. For example, the order of execution of the blocks in flow diagrams may be changed, and/or some of the blocks in block or flow diagrams described may be changed, eliminated, or combined.

To show the benefits of the present invention, the Java programming language, JVM, and a code cache for native codes are used to describe the invention. In fact, the invention is not intended to be limited to Java programming language, JVM, or the code cache for native codes. The invention can be used for other platform-independent programming languages, other systems, and/or other cache systems to improve the efficiency of cache management and thus to improve the performance of the entire system.

In the preceding description, various aspects of the present invention have been described. For purposes of explanation, specific numbers, systems and configurations were set forth in order to provide a thorough understanding of the present invention. However, it is apparent to one skilled in the art having the benefit of this disclosure that the present invention may be practiced without the specific details. In other instances, well-known features, components, or modules were omitted, simplified, combined, or split in order not to obscure the present invention.

Embodiments of the present invention may be implemented on any computing platform, which comprises hardware and operating systems.

If embodiments of the present invention are implemented in software, the software may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method for improving performance of a system running a platform-independent program, comprising:
 receiving a first code;
 compiling the first code to a second code; and
 performing priority-based code cache management (CCM) to ensure there is enough memory space in a code cache for the second code, the code cache including a plurality of blocks of code, the priority-based CCM being performed based on a priority of each of the plurality of blocks of code, wherein priority of a block of code is determined at least in part by a value of a surviving method counter (SMC) for the block of code and the SMC value is undated during runtime when at least one of the following conditions is satisfied: the block of code is live during the priority-based CCM, the block of code is dead during the priority-based CCM, and the block of code is recompiled during runtime.

2. The method of claim 1, wherein the first code comprises platform-independent code.

3. The method of claim 1, wherein the second code comprises the compiled first code in lower-level computing instructions native to an underlying computing architecture of the system.

4. The method of claim 1, wherein performing priority-based CCM comprises managing the code cache based on a priority of each of the plurality of blocks of code to make more efficient use of memory space in the code cache, and transferring the second code into the code cache if the second code is not in the code cache.

5. The method of claim 1, further comprising executing the second code.

6. A method for managing a code cache for a plurality of blocks of code, comprising:
dynamically determining if a condition for triggering priority-based code cache management (CCM) has been satisfied; and
performing selective code garbage collection (CGC) based on a priority of each of the plurality of blocks of code in the code cache, wherein priority of a block of code is determined at least in part by a value of a surviving method counter (SMC) for the block of code and the SMC value is updated during runtime when at least one of the following conditions is satisfied: the block of code is live during the priority-based CCM, the block of code is dead during the priority-based CCM, and the block of code is recompiled during runtime.

7. The method of claim 6, wherein the condition for triggering the priority-based CCM comprises at least one of the following: when a free memory size of the code cache falls below a threshold, when a number of blocks of code in the code cache exceeds a threshold, and when a size of an incoming compiled code is larger than the free memory size of the code cache.

8. The method of claim 6, further comprising initializing the SMC value of a block of code when the the block of code is first compiled.

9. The method of claim 6, further comprising limiting the value of the SMC to ensure that the value does not exceed a pre-determined range.

10. The method of claim 6, wherein performing selective CGC comprises conducting CGC for dead blocks of code based on values of SMCs of the dead blocks of code.

11. The method of claim 10, wherein conducting CGC comprises distinguishing live blocks of code from dead blocks of code based on stack information and reclaiming the memory space occupied by the dead blocks of code identified as garbage.

12. A system, comprising:
a virtual machine to receive a first code;
a Just-In-Time compiler to compile the first code to a second code;
a priority-based code cache management (CCM) mechanism to efficiently manage a code cache, and to transfer the second code to the code cache if the second code is not in the code cache, the code cache including a plurality of blocks of code, the priority-based CCM mechanism having a surviving method counter (SMC) for each of the plurality of blocks of code and managing the code cache based on a priority of each of the plurality of blocks of code, wherein priority of a block of code is determined at least in part by a value of the SMC for the block of code and the SMC value is updated during runtime when at least one of the following conditions is satisfied: the block of code is live during the priority-based CCM, the block of code is dead during the priority-based CCM, and the block of code is recompiled during runtime; and
a code garbage collector to selectively recycle dead blocks of code in the code cache based on priority information provided by the priority-based CCM mechanism.

13. The system of claim 12, wherein the virtual machine comprises an execution mechanism to execute the second code.

14. The system of claim 12, wherein the code garbage collector comprises:
a root set scanning mechanism to distinguish live blocks of code from dead blocks of code in the code cache based on stack information; and
a garbage reclamation mechanism to reclaim the memory space in the code cache occupied by the dead blocks of code identified as garbage.

15. A system to perform priority-based code cache management (CCM), comprising:
a plurality of surviving method counters (SMCs), each SMC corresponding to a block of code to measure the probability of the block of code being reused during runtime;
a plurality of SMC updating mechanisms, each corresponding to an SMC to update the value of the SMC, wherein an SMC updating mechanism updates the value of an SMC for a block of code during runtime when at least one of the following conditions is satisfied: the block of code is live during the priority-based CCM, the block of code is dead during the priority-based CCM, and the block of code is recompiled during runtime; and
a surviving method determination mechanism to monitor whether a condition for triggering priority-based CCM is met at runtime and to determine which dead methods are to be recycled based on values of the plurality of SMCs.

16. The system of claim 15, wherein the SMC updating mechanism for a block of code comprises an initialization component to identify the block of code, set up an SMC for the block of code, and initialize the SMC of the block of code.

17. A machine readable medium having content stored thereon, wherein when the content is accessed by a processor, the content provides for improving performance of a system running a platform-independent program by:
receiving a first code;
compiling the first code to a second code; and
performing priority-based code cache management (CCM) to ensure there is enough memory space in a code cache for the second code, the code cache including a plurality of blocks of code, the priority-based CCM being performed based on a priority of each of the plurality of blocks of code, wherein priority of a block of code is determined at least in part by a value of a surviving method counter (SMC) for the block of code and the SMC value is updated during runtime when at least one of the following conditions is satisfied: the block of code is live during the priority-based CCM, the block of code is dead during the priority-based CCM, and the block of code is recompiled during runtime.

18. The machine readable medium of claim 17, wherein the first code comprises platform-independent code.

19. The machine readable medium of claim 17, wherein the second code comprises the compiled first code in lower-level computing instructions native to an underlying computing architecture of the system.

20. The machine readable medium of claim 17, wherein content for performing priority-based CCM comprises content for managing the code cache based on a priority of each of the plurality of blocks of code to make more efficient use of memory space in the code cache, and transferring the second code into the code cache if the second code is not in the code cache.

21. The machine readable medium of claim 17, further comprising content for executing the second code.

22. A machine readable medium having content stored thereon, wherein when the content is accessed by a processor, the content provides for managing a code cache for a plurality of blocks of code by:
dynamically determining if a condition for triggering priority-based code cache management (CCM) has been satisfied; and
performing selective code garbage collection (CGC) based on a priority of each of the plurality of blocks of code in the code cache, wherein priority of a block of code is determined at least in part by a value of a surviving method counter (SMC) for the block of code and the SMC value is updated during runtime when at least one of the following conditions is satisfied: the block of code is live during the priority-based CCM, the block of code is dead during the priority-based CCM, and the block of code is recompiled during runtime.

23. The machine readable medium of claim 22, wherein the condition for triggering the priority-based CCM comprises at least one of the following: when a free memory size of the code cache falls below a threshold, when a number of blocks of code in the code cache exceeds a threshold, and when a size of an incoming compiled code is larger than the free memory size of the code cache.

24. The machine readable medium of claim 22, further comprising content for initializing the SMC value of a block of code when the the block of code is first compiled.

25. The machine readable medium of claim 22, further comprising content for limiting the value of the SMC to ensure that the value does not exceed a pre-determined range.

26. The machine readable medium of claim 22, wherein content for performing selective CGC comprises content for conducting CGC for dead blocks of code based on values of SMCs of the dead blocks of code.

27. The machine readable medium of claim 26, wherein content for conducting CGC comprises content for distinguishing live blocks of code from dead blocks of code based on stack information and reclaiming the memory space occupied by the dead blocks of code identified as garbage.

* * * * *